United States Patent
Fey et al.

(10) Patent No.: US 6,901,552 B1
(45) Date of Patent: May 31, 2005

(54) SYSTEM FOR STORING DATA WORDS IN A RAM MODULE

(75) Inventors: Wolfgang Fey, Niedernhausen (DE); Adrian Traskov, Steinbach (DE); Jan Truoel, Griesheim (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 429 days.

(21) Appl. No.: 10/088,957

(22) PCT Filed: Aug. 29, 2000

(86) PCT No.: PCT/EP00/08398

§ 371 (c)(1),
(2), (4) Date: Mar. 22, 2002

(87) PCT Pub. No.: WO01/22225

PCT Pub. Date: Mar. 29, 2001

(30) Foreign Application Priority Data

Sep. 22, 1999 (DE) .......................................... 199 45 494
Apr. 15, 2000 (DE) .......................................... 100 18 722

(51) Int. Cl.⁷ ............................................ H03M 13/00
(52) U.S. Cl. ..................................................... 714/800
(58) Field of Search ................................ 714/800, 799, 714/798, 758, 752, 805, 763, 764, 765

(56) References Cited

U.S. PATENT DOCUMENTS 3,972,033 A 7/1976 Cislaghi et al.
4,277,844 A 7/1981 Hancock et al.
4,384,353 A 5/1983 Varshney
4,710,934 A 12/1987 Traynor

FOREIGN PATENT DOCUMENTS

DE 689 26 410 T2 6/1989

OTHER PUBLICATIONS

Vertical Parity Correction. In: IBM Technical Disclosure Bulletin, vol. 33, No. 6A, Nov. 1990, pp. 85–87.
Hölscher.H., Rader,J.: Mikrocomputer in der Sicherheitstechnik, Verlag TüV Rheinland, 1984, ISBN 3–88585–180–6; pp. 7–27 and 7–29.
Search Report of the German Patent Office for Appln 10018722.6.

Primary Examiner—Guy J. Lamarre
Assistant Examiner—James C Kerveros
(74) Attorney, Agent, or Firm—Honigman Miller Schwartz and Cohn LLP

(57) ABSTRACT

The present invention describes a method of storing data words in a RAM module which is especially suited for applications that are critical in terms of safety and includes the following steps: producing a check bit word from at least one data word when writing the at least one data word into the RAM module, storing the check bit word, reading out the check bit word when reading out the at least one data word from the RAM module, regenerating the check bit word from the at least one read-out data word, comparing the read-out check bit word with the regenerated check bit word and generating an error message if they do not correspond. This invention further relates to a corresponding circuit configuration.

5 Claims, 4 Drawing Sheets

SYSTEM FOR STORING DATA WORDS IN A RAM MODULE

TECHNICAL FIELD

The present invention generally relates to memory storage systems and more particularly relates to a method and a circuit configuration for storing data words in a RAM module.

BACKGROUND OF THE INVENTION

RAM (Random Access Memory) modules are generally known in the art and common in use. They are employed for repeatedly storing and reading out data for a great number of applications. Special attention must be paid to the integrity of data stored in the RAM module when designing the memory architecture. In a prior art scheme, data integrity is ensured by a fully redundant design of the module in a relatively reliable fashion. A major shortcoming in this respect is, however, that the financial cost is relatively high.

In view of the above, an object of the present invention is to provide a method and a circuit configuration for storing data words in a RAM module whose demand in junction is considerably lower, without suffering from limitations with respect to data integrity.

This object is achieved by a method according to the following steps: producing a check bit word from at least one data word when writing the at least one data word into the RAM module, storing the check bit word, reading out the check bit word when reading out the at least one data word from the RAM module, regenerating the check bit word from the at least one read-out data word, comparing the read-out check bit word with the regenerated check bit word and generating an error message if they do not correspond.

Further, the object is achieved by a circuit configuration according to claim 7 which is characterized by: a first circuit unit for generating a check bit word from at least one data word when writing and reading the at least one data word, a number of registers for the associated storage of check bit words for the data words, and a second circuit unit by means of which, when reading data words, the associated check bit word is compared to the check bit word regenerated by the first circuit unit, and for generating an error message if the check bit words do not correspond.

A special advantage of this solution involves that in the event of basically equal data integrity as in the above-mentioned fully redundant design, the necessary silicon junction and, hence, the circuit design effort and costs is considerably lower.

DETAILED DESCRIPTION OF THE PREFERRED EMBODIMENTS

Figure 1:
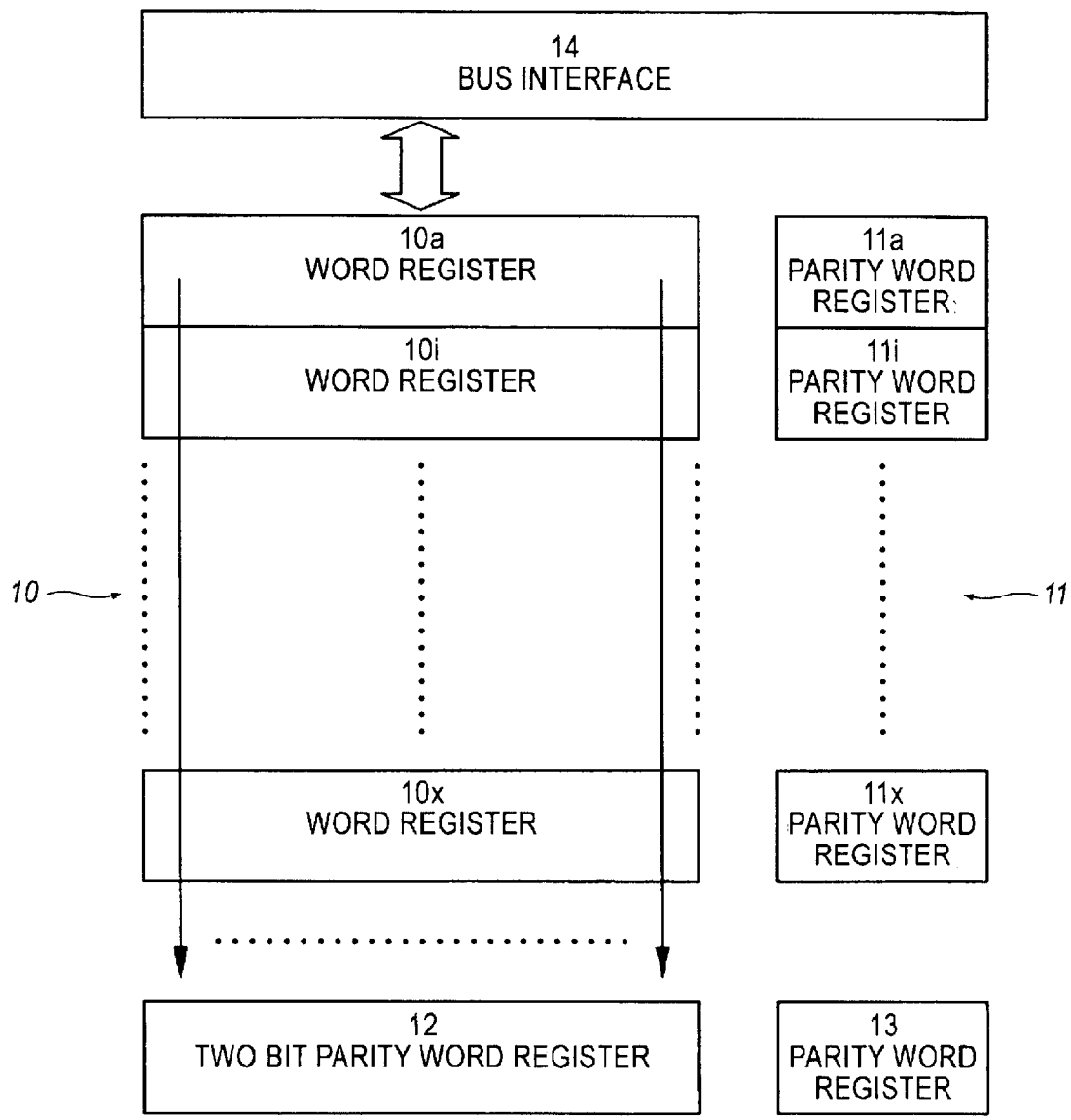
FIG. 1 is a schematic view of a first memory scheme.

According to FIG. 1, a RAM module generally comprises a word-oriented array 10 made up of a number of 32 bit data word registers 10a, ... 10, ... 10x which are illustrated as being arranged one below the other in rows. A 2 bit parity word register 11a, ... 11i, ... 11x is associated with each data word register so that a 2 bit parity array 11 is the result. There is further provision of a 2 bit parity word register 12 allocated to which, in turn, is a 2 bit parity word register 13.

For the purpose of data exchange, this arrangement is connected in a known fashion to a bus interface 14 by means of which a connection to a CPU bus can be established. The bus interface 14 further comprises circuit units for generating and comparing the parity words in writing and reading operations which are illustrated in FIGS. 2 and 3.

Figure 2:
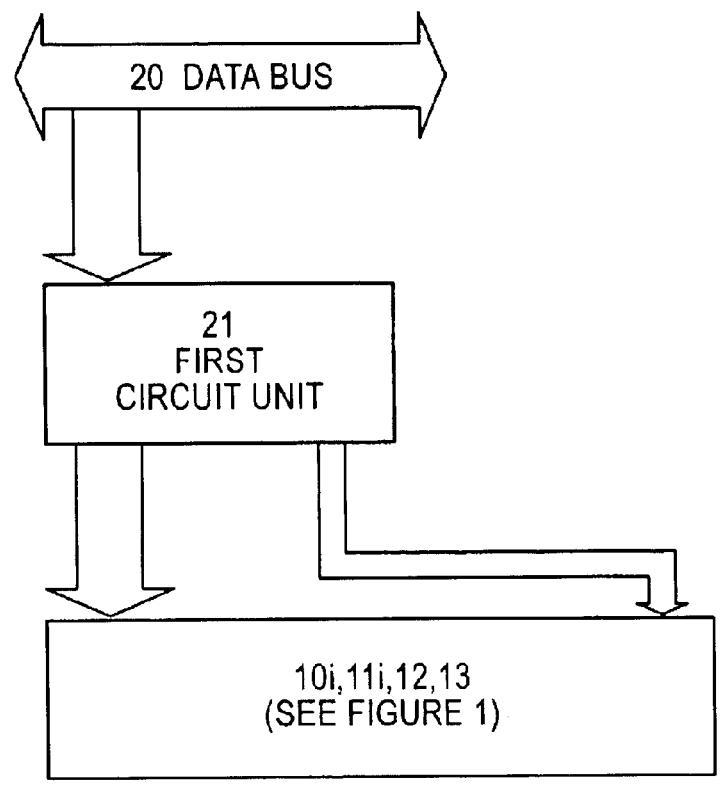
FIG. 2 is a schematic view of the course of a writing operation.
Figure 3:
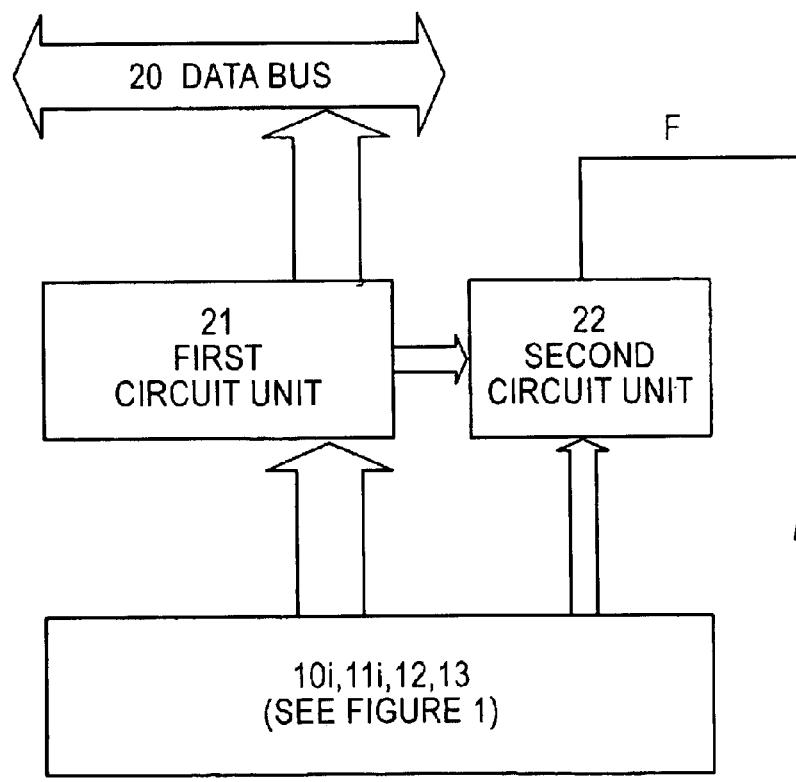
FIG. 3 is a schematic view of the course of a reading operation.

For writing into the RAM module, the respective data words are sent by a 32 bit data bus 20 to a first circuit unit 21 used to generate a 2 bit parity word with respect to each data word according to FIG. 2. Subsequently, the data word is written into one of the data word registers 10i in the RAM module, and the 2 bit parity word is written into the associated 2 bit parity word register 11i.

To read data words out of the RAM module, the addressed data word is initially sent to the first circuit unit 21. The associated 2 bit parity word is simultaneously transmitted into a second circuit unit 22. In the first circuit unit 21, in turn, a 2 bit parity word is generated from the read-out data word and sent to the second circuit unit 22, where it is compared with the 2 bit parity word directly read out of the RAM module. If these two words do not correspond, an error signal F is produced or a corresponding error flag is set. If the 2 bit parity words correspond, the read-out data word is transmitted to the data bus 20.

Figure 4:
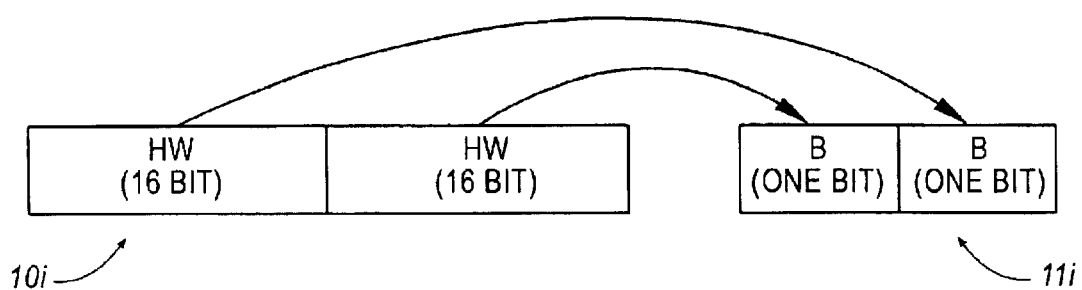
FIG. 4 shows the generation of a word-oriented parity.

According to FIG. 4, each 32 bit data word is composed of a first and a second 16 bit halfword HW, and a bit B of the 2 bit parity word is generated from each halfword.

Individual bit errors may be detected at once 'online' when reading out of the RAM module due to the automatic generation and the automatic comparison of these word-oriented parities.

To reach a still greater safety of error prevention, the 2 bit parity generation may also be replaced by a CRC (Cyclic Redundancy Check) check with a CRC word calculated for each data word according to a polynomial. To achieve an expedient ratio between the length of a data word and the length of a CRC word, the memory scheme is chosen so that the length of the stored data words (memory words) is a multiple of the length of the data words on the data bus. In the event of a data word length of 32 bit, the memory word preferably has a length of 128 bit and the CRC word for an optimal error prevention safety has a length of 9 bit.

Figure 5:
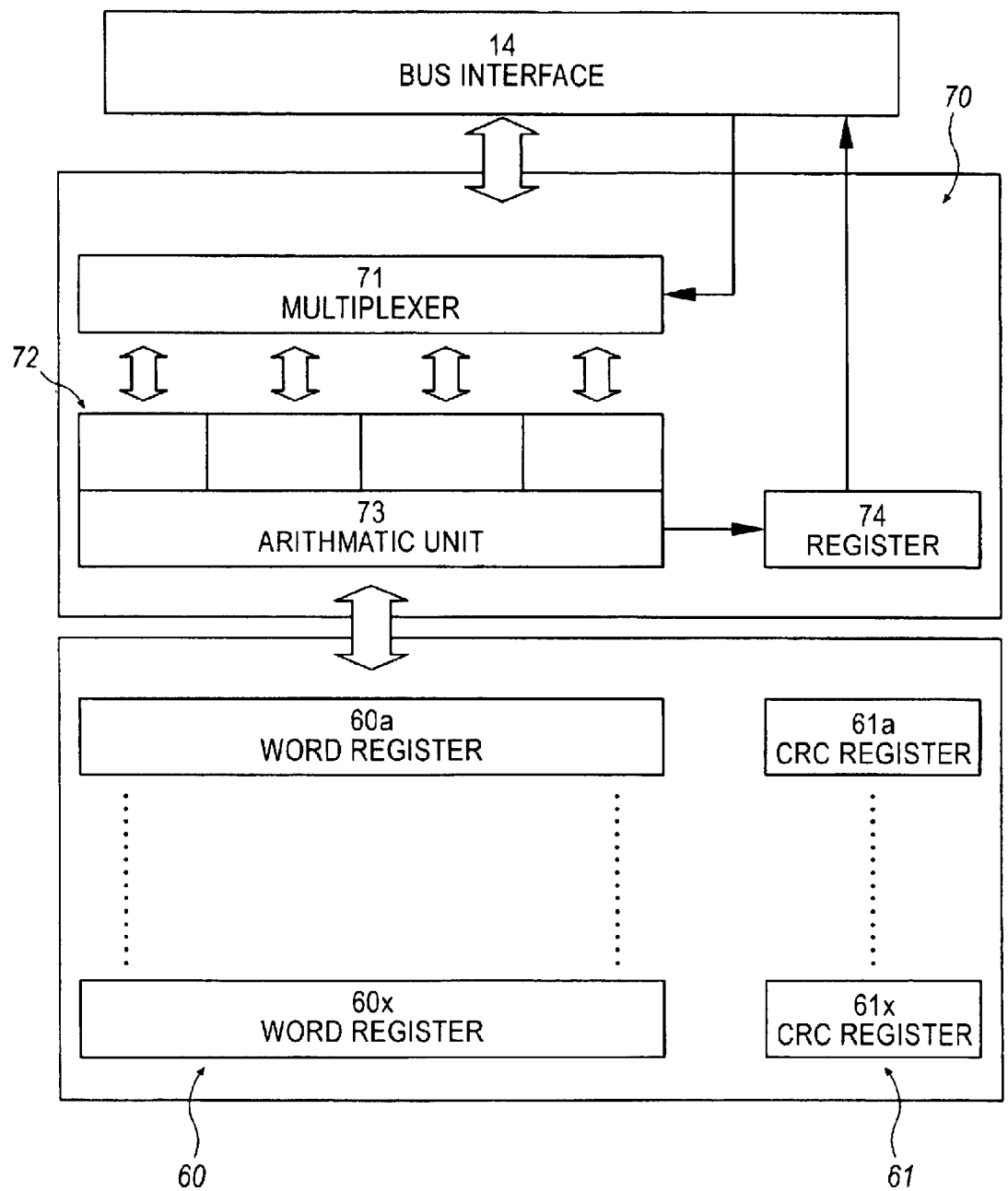
FIG. 5 is a schematic view of a second memory scheme.

FIG. 5 shows a corresponding arrangement which is connected to a 32 bit data bus (not shown) by way of the bus interface 14.

The RAM module comprises an array 60 made up of a number of 128 bit memory word registers 60a, ... 60x which are shown as being arranged one below the other in rows. Associated with each memory word register is a CRC register 61a, ... 61x with e.g. 9 bits in each case so that a CRC array 61 is achieved.

Interconnected between the array 60 and the bus interface 14 is a unit 70 which includes a multiplexer 71 for 32 bit data words each and a 128 bit CRC arithmetic register 72 for receiving four 32 bit data words. Further, unit 70 comprises a CRC arithmetic unit 73, by means of which a 9 bit CRC word is calculated from the contents of the 128 bit CRC arithmetic register 72 by known calculation methods and intermediately stored in a 9 bit CRC register 74 which, in turn, is connected to the bus interface 14.

The writing and reading operations basically take place in the same manner as shown in FIGS. 2 and 3.

In the operation of writing into the RAM module, four 32 bit data words which are input by way of the bus interface 14 are cyclically stored consecutively in the 128 bit CRC arithmetic register 72 by means of the multiplexer 71 so that a 128 bit CRC memory word is achieved. From this the 9 bit CRC word is calculated with the CRC arithmetic unit 73 and registered in the 9 bit CRC register 74. Subsequently, the contents of the 128 bit CRC arithmetic register 72 is stored in one of the 128 bit memory word registers 60$i$ of the RAM array, and the contents of the 9 bit CRC register 74 is stored in the associated 9 bit CRC word register 61$i$.

When writing a new 32 bit data word (or shorter word units) into the RAM module, it is necessary to recalculate the CRC word of the respective 128 bit memory word register 60$i$. This means that before writing the new data word, it is first necessary to fully read out the contents of the respective 128 bit memory word register 60$i$ and to store it in the CRC arithmetic register 72. Subsequently, the 9 bit CRC word is recalculated with the CRC arithmetic unit 73 on the basis of the new data word and stored in the CRC register 74. The contents of both registers 72, 74 are then transferred into the corresponding registers 60$i$, 61$i$.

If it is desired to perform an error check before writing a new 32 bit data word, which check may be triggered in defined intervals by e.g. a software, initially, the contents of the respective 128 bit memory word register 609 and the contents of the associated CRC register 61$i$ is read out, as mentioned above. Thereafter, the 9 bit CRC word is regenerated therefrom by CRC arithmetic unit 73 and compared with the read-out CRC word. If these two CRC words do not correspond, an error signal F (or a corresponding error flag) is produced. If the CRC words correspond, a new 9 bit CRC word is calculated from the 128 bit memory word which contains the new 32 bit data word, as has been explained hereinabove, and both are read in the corresponding 128 bit memory word register 60i or the associated 9 bit CRC register 61i of the RAM module, respectively.

The error check can be performed even if it is desired to read out a data word from the RAM module on the data bus 20. For this purpose, the contents of the memory word register 60$i$ that contains the respective data word is transferred into the CRC arithmetic register 72, and the CRC word is recalculated therefrom. This CRC word is compared to the CRC word memorized in the associated CRC word register 61$i$. If the two words do not correspond, an error message F is generated or a corresponding error flag set. If both CRC words correspond, the read-out 32 bit data word is transferred to the data bus 20. Thereafter, the contents of the CRC arithmetic register 72 is returned into the corresponding 128 bit memory word register 60$i$.

Figure 6:
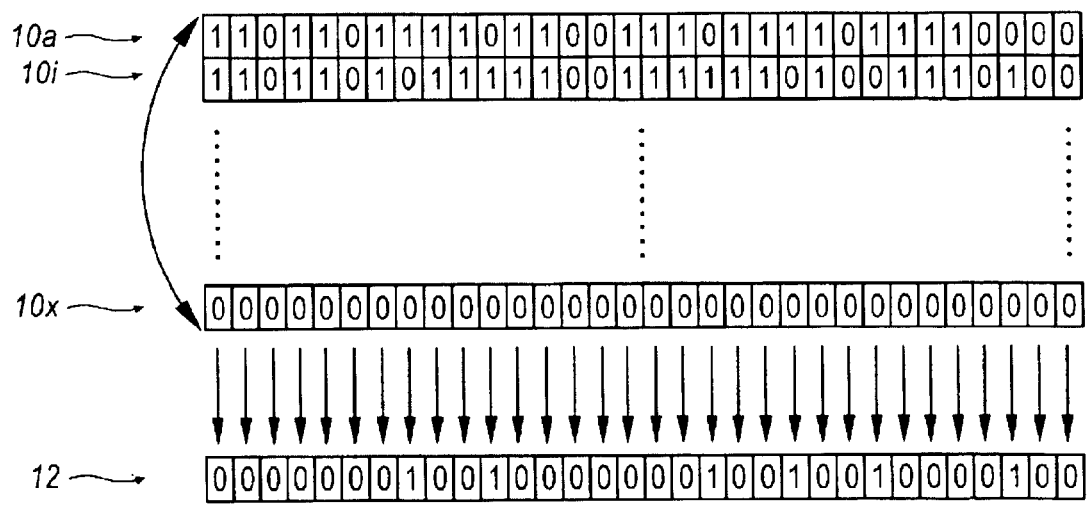
FIG. 6 shows the generation of a column-oriented parity.

FIG. 6 shows several memory word registers 10$a$, 10$b$, ... 10$x$, for 32 bit data words and a 32 bit parity word register 12, wherein a bit with the value 0 or 1 is illustrated for each digit as an example.

In contrast to the word-oriented check bit generation shown in FIGS. 4 and 5, a column-oriented parity is generated according to FIG. 6, wherein for respectively equal digits of all data words a parity bit is determined which is written into an associated digit in the 32 bit parity word register 32. A 32 bit parity word is thus achieved. Further, a 2 bit parity word can be generated and stored in the 2 bit parity word register 13 (see FIG. 1) with respect to the above 32 bit parity word in the same manner as was described for the word-oriented parity by way of FIG. 4. Corresponding to the fashion described hereinabove, a column-oriented parity check can be performed in the embodiment of FIG. 5 with 128 bit long data words.

When writing a new data word in one of the word registers 10$i$ of the RAM module, first the contents of the data word of the memory digit being described in the RAM module, i.e., a 32 bit data word register 10$i$ in the present example, and the 32 bit parity word register 12 is read out. Thereafter, the value of the column-oriented 32 bit parity word is determined and described again.

Subsequently, the new data word is re-written in the corresponding data word registers 10$i$, and the contents of the 32 bit parity word register 12 is re-determined. Following this operation, again a 2 bit parity can be generated with respect to the 32 bit parity word and stored in the 2 bit parity word register 13 (see FIG. 1).

It is preferred that an error check is not performed during a normal reading operation. An additional error check may be carried out in that in the manner described above, e.g. at the point of time during a reading operation, the contents of all data word registers 10$i$ is read out, the column-oriented 32 bit parity word is regenerated and compared with the parity word stored in the parity word register 12. If the parity words do not correspond, an error message F is produced or a corresponding error flag is set. If the parity words correspond, the read-out data word is transferred to the data bus 20. The column-oriented error check in the entire RAM described in the embodiment hereinabove is expediently not performed with each writing or reading operation but at defined intervals, and it is possible that the said intervals are predetermined by the software used. The decision whether this error check takes place or not is preferably made by the implemented software.

The 2 bit parity word of the 32 bit parity word can be used for error checks in the same way as it was described by way of FIGS. 2 to 4 for the 2 bit parity words of the data words.

Instead of the column-oriented parity, a column-oriented CRC (Cyclic Redundancy Check) sum may be produced and used for error checks. Before writing and/or reading a word, first the contents of all data word registers 10$i$ and check bit register 12 are read out, and the CRC word is determined again also in this case. If this CRC word does not correspond with the memorized CRC word, an error message F is produced or a corresponding error flag is set. If both CRC words correspond, the writing or reading operation is concluded in the manner described in the above with respect to the column-oriented parity word generation.

The column-oriented parity and a cyclically occurring parity check or the CRC check sum and a cyclic CRC calculation permit detecting errors in the address decoder as well as double bit errors and further errors. The checks or calculations, respectively, are preferably performed by a corresponding software.

What is claimed is:

1. Circuit configuration for storing data words in a RAM module, comprising:

a first circuit unit for generating a check bit word from at least one data word when writing and reading the at least one data word, a plurality of registers for the allocated storage of check bit words for the data words, and a second circuit unit by means of which, when reading data words, the associated check bit word is compared to the check bit word regenerated by the first circuit unit, and for generating an error message if the check bit words do not correspond, wherein the number of registers in said plurality of registers is determined by including one CRC register for each four data words, a CRC arithmetic register for storing four data words as one memory word using a multiplexer, wherein said CRC arithmetic register calculates the memory word and stores the memory word in an associated CRC registers.

2. Circuit configuration as claimed in claim 1, wherein the number of registers in said plurality of registers is determined by including one 2-bit parity register for each data word.

3. Circuit configuration as claimed in claim 1, wherein the data words are 32 bits long and the CRC words are 9 bits long.

4. Circuit configuration as claimed in claim 1, further including a global check bit word register for storing a global check bit word, the bits of which are respectively determined from equal digits of all data words, and an associated register for storing a check bit word which is determined from the contents of the global register.

5. Circuit configuration for storing data words in a RAM module, comprising:

a first circuit unit for generating a check bit word from at least one data word when writing and reading the at least one data word, a plurality of register or the allocated storage of check bit words for the data words, and a second circuit unit by means of which, when reading data words, the associated check bit word is compared to the check bit word regenerated by the first circuit unit, and for generating an error message if the check bit words do not correspond, a global check bit register for storing a global check bit word, the bits of which are respectively determined from equal digits of all data words, and an associated register for storing a check bit word which is determined from the contents of the global register.

* * * * *